(12) United States Patent
Peng et al.

(10) Patent No.: US 8,986,815 B2
(45) Date of Patent: Mar. 24, 2015

(54) FLAME RETARDANT POLYMER JACKET

(75) Inventors: Ying Peng, New Albany, OH (US); Neil Hettler, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 733 days.

(21) Appl. No.: 13/187,197

(22) Filed: Jul. 20, 2011

(65) Prior Publication Data

US 2012/0021184 A1 Jan. 26, 2012

Related U.S. Application Data (60) Provisional application No. 61/365,808, filed on Jul. 20, 2010.

(51) Int. Cl.
| | |
|---|---|
| *B32B 3/00* | (2006.01) |
| *E04B 1/76* | (2006.01) |
| *B32B 7/02* | (2006.01) |
| *B32B 27/30* | (2006.01) |
| *B32B 27/32* | (2006.01) |
| *B32B 27/36* | (2006.01) |
| *B32B 37/15* | (2006.01) |
| *F16L 59/10* | (2006.01) |
| *B32B 38/06* | (2006.01) |

(52) U.S. Cl.
CPC ............ *E04B 1/7662* (2013.01); *B32B 7/02* (2013.01); *B32B 27/30* (2013.01); *B32B 27/32* (2013.01); *B32B 27/36* (2013.01); *B32B 37/153* (2013.01); *F16L 59/10* (2013.01); *B32B 38/06* (2013.01); *B32B 2307/3065* (2013.01); *B32B 2309/105* (2013.01); *B32B 2327/06* (2013.01); *B32B 2367/00* (2013.01); *B32B 2419/00* (2013.01); *B32B 2607/00* (2013.01); *Y10S 428/92* (2013.01)
USPC ........................... 428/172; 428/156; 428/920

(58) Field of Classification Search
CPC .......... B32B 1/08; B32B 27/32; B32B 15/08; F16L 58/1054; F16L 59/10; F16L 59/145; F16L 59/00; H01B 17/50; H01B 17/58; H01B 7/17; H01B 7/1875; H01B 7/2806
USPC ......... 428/34.1, 34.6, 34.7, 35.7, 35.9, 36.91, 428/920, 921, 172, 156, 141; 174/107; 138/140, 141, 149
See application file for complete search history.

(56) References Cited

U.S. PATENT DOCUMENTS 3,955,031 A 5/1976 Jones et al.
4,451,586 A 5/1984 Searl et al.
(Continued)

OTHER PUBLICATIONS

International Search Report and Written Opinion from PCT/US11/44699 dated Dec. 12, 2011.
(Continued)

*Primary Examiner* — Catherine A Simone
(74) *Attorney, Agent, or Firm* — Calfee, Halter & Griswold LLP (57) ABSTRACT

A jacket configured to encase building component insulation is provided. The jacket comprises at least inner layer, an intermediate layer attached to the inner layer, and an outer layer attached to the intermediate layer. The inner layer, intermediate layer and outer layers are configured for attachment to each other with the use at least one of heat, polymeric material, and pressure. Additionally, the jacket complies with the standards of flame retardancy as provided by ASTM C1136.

26 Claims, 6 Drawing Sheets

(56) References Cited

U.S. PATENT DOCUMENTS

| | | |
|---|---|---|
| 5,947,158 A | 9/1999 | Gross et al. |
| 6,735,832 B1 | 5/2004 | Putnam et al. |
| 6,924,243 B2 | 8/2005 | Snyder |
| 2004/0163724 A1 | 8/2004 | Trabbold et al. |
| 2006/0054235 A1 | 3/2006 | Cohen et al. |
| 2006/0060256 A1 | 3/2006 | Keyes |
| 2006/0237084 A1 | 10/2006 | Hoffmann |
| 2009/0250136 A1 | 10/2009 | Roberts et al. |
| 2010/0071797 A1* | 3/2010 | Jungers ......................... 138/141 |

OTHER PUBLICATIONS

Office action from Chinese Application No. 201180040260.6 dated May 28, 2014.

Office action from Chinese Application No. 201180040260.6 dated Jan. 6, 2015.

* cited by examiner

FLAME RETARDANT POLYMER JACKET

CROSS REFERENCE TO RELATED APPLICATIONS

This application claims priority to U.S. Provisional Patent Application No. 61/365,808, filed Jul. 20, 2010, which is hereby incorporated by reference in its entirety.

BACKGROUND

Building components, such as ducts and pipes, are typically covered with an exterior layer of insulation. Properly insulating such components can help improve a home's energy efficiency and general durability. The insulation material used for these building components is often comprised of a relatively thick layer of bulk insulating material, such as fiberglass or mineral wool and is configured to encase the building component. Such insulation materials are generally provided in the form of continuous lengths, packaged in rolls, or of individual panels, or batts, with facing materials on one or both major surfaces.

In some instances the insulation material can include an exterior layer that provides a protective facing or jacket. The jacket or facing can include various layers configured for providing various characteristics to the facing, such as include vapor impermeability, fire resistance, mold resistance, puncture resistance and durability. Such other layers generally include an over-laid scrim or layer of foil or paper.

Useful facings or facing sheets for insulation materials generally include kraft paper, a tri-directional scrim, and foil and are bonded to a major face of the insulation material by an adhesive layer. The facing may be adhered to the insulation materials in a number of ways, such as solvent or water based adhesives, hot-melt adhesives, and other specialized adhesives. One cause of concern with paper facings is the potential for mold or mildew growth. In an effort to reduce the threat of mold, tri-directional scrims were included to reinforce laminates and gain improved mechanical properties, such as tensile strength, tear resistance and Mullen burst strength. Alternatively, a layer of polymeric material such as polypropylene may be added to the top of the paper layer to protect the paper from mold. However, both of the above described multilayer structures still suffer from mold or mildew growth due to the exposure of the paper layer.

Accordingly, there is a need for an insulation facing or jacket that provides better mold resistance, improved mechanical properties and durability, and excellent fire resistance that is easy to apply and install at the job site.

SUMMARY OF THE INVENTION

In accordance with one aspect of the present invention, a jacket configured to encase building component insulation is provided. The jacket comprises an inner layer, an intermediate layer attached to the inner layer, and an outer layer attached to the intermediate layer. The inner layer, intermediate layer and outer layers are configured for attachment to each other with the use of heat, polymeric material, and pressure. Additionally, the jacket complies with the standards of flame retardancy as provided by ASTM C1136.

In accordance with another aspect of the present invention, a jacket configured to encase building component insulation is provided. The jacket comprises an inner layer, a first intermediate layer attached to the inner layer, a second intermediate layer attached to the first intermediate layer, and an outer layer attached to the second intermediate layer, wherein the inner layer, first intermediate layer, second intermediate layer and outer layer are each configured for attachment with the use of one or more of heat, polymeric material, and compression. The jacket may optionally include a third intermediate layer between the second intermediate layer and the outer layer. The jacket complies with the standards of flame retardancy as provided by ASTM C1136.

In accordance with yet another aspect of the present invention, a method for forming a fire retardant insulation jacket is provided. The method includes providing an intermediate layer, having a top surface and a bottom surface, extruding an inner layer through a first extruder below the bottom surface, extruding an outer layer through a second extruder over the top surface, and attaching the inner and outer layers to the intermediate layer through at least one of heat, polymeric material, and compression.

In accordance with another aspect of the present invention, a method for forming an insulation jacket is provided that includes providing a first intermediate layer, paying out an inner layer from a first roll, paying out a second intermediate layer through a second roll, optionally paying out a third intermediate layer through a third roll, paying out an outer layer through a third roll, heat compressing the inner layer, first intermediate layer, second intermediate layer, optional third layer, and outer layer to form a layered jacket. The layers are attached without the use of an adhesive.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose fire retardant polymer jackets for insulation products. The terms "facing" or "jacket", as used herein, is defined to mean a covering for insulation materials. The term "insulation materials", as used herein, is defined to mean any materials used to insulate a building component. The term "fire retardant" or "flame retardant", as used herein, is defined to mean any material exhibiting resistance to the spread of fire and resistance to the generation of smoke.

Figure 1:
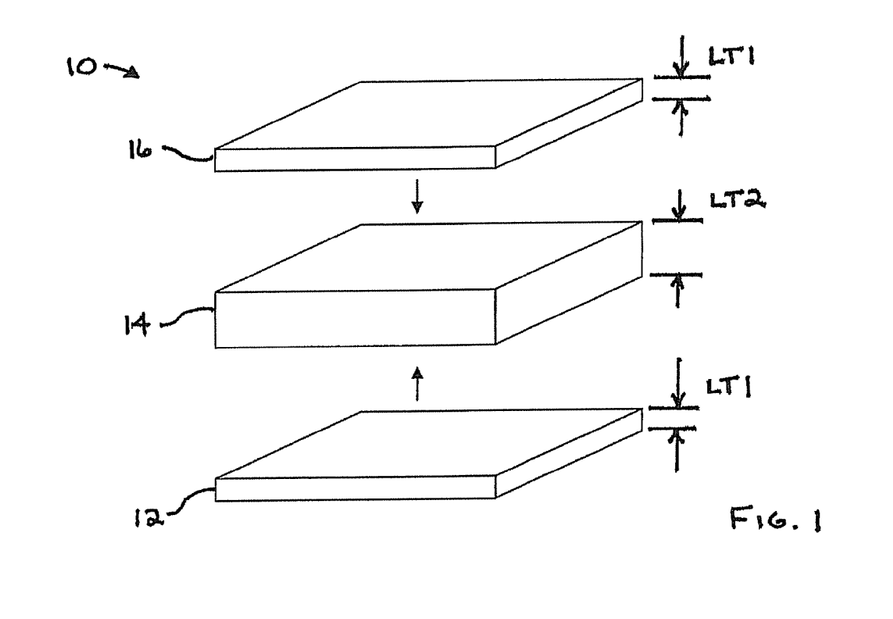
FIG. 1 is an exploded schematic view of a first aspect of an insulation jacket illustrating various jacket layers.

Referring now to FIG. 1, a first embodiment of a jacket is shown generally at 10 in an exploded view. In certain embodiments, the jacket 10 is configured to be a vapor-retarding outer covering for pipe insulation. In other embodiments, the jacket 10 is configured to be a vapor-retarding outer covering for insulation encasing other building components, including the non-limiting example of insulation for HVAC duct. As will be discussed in more detail below, the jacket 10 includes various layers, with the various layers being configured to provide one or more desired characteristic to the jacket 10. The jacket 10 includes an inner layer 12, an intermediate layer 14 and an outer layer 16.

Referring again to FIG. 1, the inner layer 12 and the outer layer 16 are configured to provide the jacket 10 with flexibility, durability and resistance to many chemicals and fluids. In the illustrated embodiment, the inner layer 12 and the outer layer 16 are formed from a polymeric material, such as for example, low-density polyethylene (LDPE). In other embodiments, the inner layer 12 and the outer layer 16 can be formed from other polymeric materials, including the non-limiting examples of polypropylene or metalized polymeric materials. In some embodiments, the inner layer 12 and the outer layer 16 can be formed from materials including a halogen-based fire-retardant material. In still other embodiments, the inner layer 12 and the outer layer 16 can include a halogen-based fire retardant coating.

The inner layer 12 and the outer layer 16 have a layer thickness LT1. In the illustrated embodiment, the layer thickness LT1 is in a range of from about 1.0 mil to about 3.0 mil. However, in other embodiments, the layer thickness LT1 can be less than about 1.0 mil or more than about 3.0 mil. While the embodiment illustrated in FIG. 1 shows the layer thickness LT1 for the inner layer 12 and the outer layer 16 to be the same, it should be appreciated that in other embodiments, the layer thickness LT1 of the inner layer 12 and the outer layer 16 can be different from each other.

Referring again to FIG. 1, the intermediate layer 14 is configured to provide the jacket 10 with tensile strength, puncture resistance and resistance to many chemicals and fluids. In the illustrated embodiment, the intermediate layer 14 is formed from a polymeric material, such as for example, high-density polyethylene (HDPE). In other embodiments, the intermediate layer 14 can be formed from other polymeric materials, including the non-limiting example of polyvinylidene chloride (PVDC). In some embodiments, the intermediate layer 14 can be formed from halogen-based fire-retardant materials. In still other embodiments, the intermediate layer 14 can include a halogen-based fire retardant coating.

The intermediate layer 14 has a layer thickness LT2. In the illustrated embodiment, the layer thickness LT2 is in a range of from about 4.0 mil to about 6.0 mil. However, in other embodiments, the layer thickness LT2 can be less than about 4.0 mil or more than about 6.0 mil.

Figure 2:
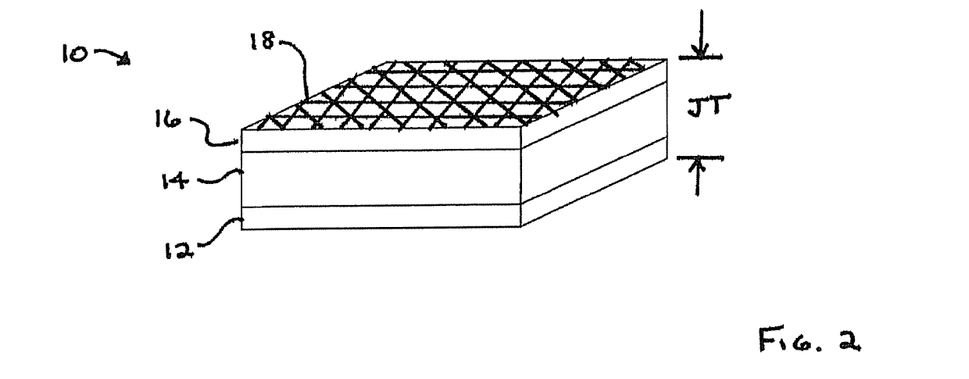
FIG. 2 is a schematic view of the insulation jacket of FIG. 1 illustrated in an assembled condition.

Referring now to FIG. 2, the inner layer 12, intermediate layer 14 and outer layer 16 have been joined together to form the jacket 10. The manufacturing process for producing the jacket 10 will be discussed below. The jacket 10 has a jacket thickness JT. In the illustrated embodiment, the jacket thickness JT is in a range of from about 5.0 mil to about 9.0 mil. However, in other embodiments, the jacket thickness JT can be less than about 5.0 mil or more than about 9.0 mil.

Traditionally, jackets that include an overlaid or woven scrim have an appearance of a lined pattern that is visible when used to cover insulation. Accordingly, it is desirable to maintain this patterned appearance, such that parts of an old facing may be replaced with a new facing without the appearance being affected. Therefore, a pattern of lines 18 may be formed on the outer surface of the outer layer 16 of the jacket 10. The pattern of lines 18 is configured to provide an aesthetically pleasing appearance to the jacket 10 and maintain the traditional patterned surface. The pattern of lines 18 may be formed in any desired manner, including the non-limiting example of embossing.

Figure 3:
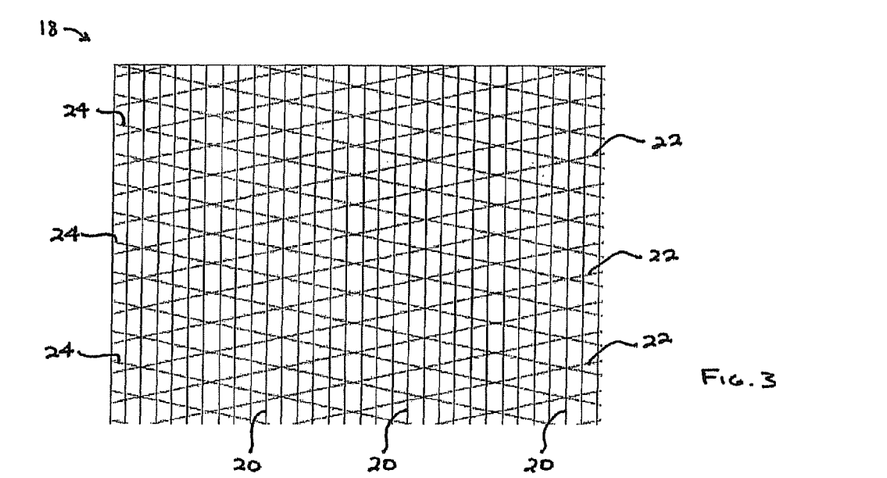
FIG. 3 is a plan view of a tri-directional pattern of lines optionally embossed on the insulation jacket of FIG. 2.

FIG. 3 provides one example of a pattern of lines 18. The pattern of lines 18 is termed a "tri-directional" pattern as a first set of parallel lines 20 oriented in one direction intersect with a second set of parallel lines 22 oriented in a second direction and a third set of parallel lines 24 oriented in a third direction. While the embodiment illustrated in FIG. 2 provides for pattern of lines 18 having a tri-directional pattern, it should be appreciated that in other embodiments, the jacket 10 may have a different pattern of lines, including the non-limiting example of a bi-directional pattern of lines.

Referring again to the embodiment illustrated in FIG. 2, the jacket 10 differs from conventional jackets in that the jacket 10 is formed of different layer materials that include an embossed pattern of lines rather than a woven/overlaid scrim layer, and is further formed without the use of laminating adhesives. The layered materials, elimination of the woven/overlaid scrim layer and the elimination of laminating adhesives advantageously provide the jacket 10 with superior characteristics, including improved flame retardancy.

Standards for permanence of flame retardancy for flexible, low-permeance vapor retarders for thermal insulation include ASTM C1136. ASTM C1136 provides that vapor retarders containing paper or paper products shall not demonstrate an increase in char length of more than 20% compared to a non-treated specimen when tested in accordance TAPPI T461 test methods. While ASTM C1136 is directed to vapor retarders containing paper or paper products, this test method is applicable to other facing materials since specific test methods and pass/fail criteria for flame retardancy as applied to polymer based jackets have not been developed. Test method TAPPI T461 provides a method for testing the flame resistance of paper and paperboard not over 1.6 mm (0.063 in.) in thickness that has been treated to prevent the spread of flame when ignited. The test is conducted using an ignition source positioned directly under the bottom edge of a specimen. The ignition source is a gas burner. During the test, the ignition source produces a flame that is 40 mm (1.6 in.) high for 12.0 seconds, and then the ignition source is removed. The flaming time, glowing time and char length are recorded after the specimen has ceased flaming. If a specimen burns along its 8.25 inch length during the test, then the specimen is regarded as a failure under the ASTM C1136 specification.

Figure 4:
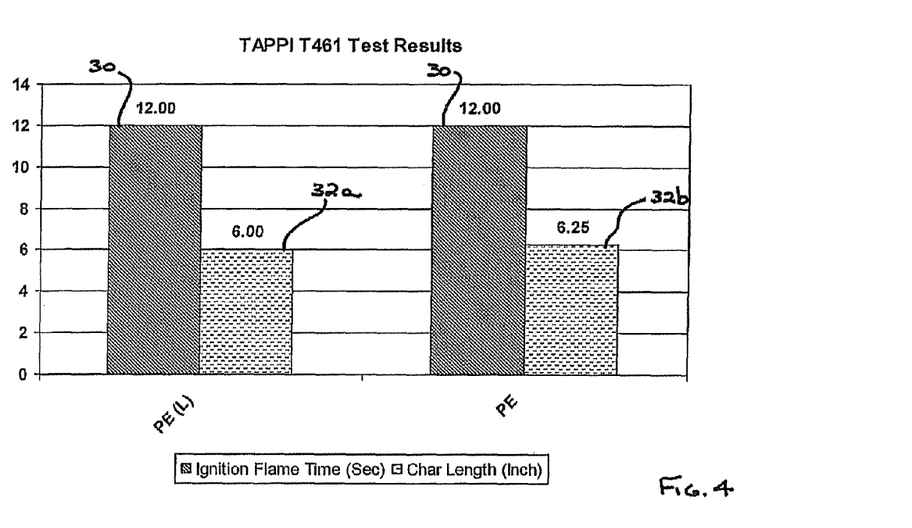
FIG. 4 is a chart illustrating the results of flame retardancy testing for the insulation jacket of FIG. 2.

The results of the TAPPI T461 testing for the jacket 10 are shown in the chart of FIG. 4. Two specimens of the jacket 10 illustrated in FIG. 2 were tested. While the tested specimens were not embossed as described herein, it is believed that the test results would be the same or similar for embossed specimens. The first specimen was a three layered polyethylene specimen and the second specimen was a three layered leached polyethylene specimen. Each specimen was tested with a flame duration 30 of 12.0 seconds. As shown in the chart, a flame duration 30 of 12.0 seconds resulted in a char length 32a of 6.0 inches for the leached specimen and a char length 32b of 6.25 inches for the standard specimen. The char lengths, 32a and 32b, of the specimens were less than 8.25 inches and a comparison of the char lengths, 32a and 32b, demonstrated an increase in char length of less than 20%. Accordingly, the jacket 10 passed the flame retardancy standards provided by ASTM C1136.

Without being bound by the theory, it is believed the jacket 10 achieves the flame retardancy standards of ASTM C1136 for several reasons. First, by eliminating the laminating adhesives used to laminate the various layers of the jacket 12, a fuel source for the test flame is eliminated. Second, the various polymer layers have a tendency to "melt" away from an applied flame. In other words, the polymer layers have a means for "escaping" or withdrawing from the applied flame, rather than maintaining a presence to the applied flame and providing a supply of fuel to the applied flame. Third, the elimination of a conventional woven/overlaid scrim layer eliminates a reinforcement that can "hold" burnable material in the path of a flame. Finally, in the event the layers, 12, 14 or 16, include a halogen-based or halogen-free fire retardant material or coating, vapors emitting from a heated jacket 10 can act to substantially "snuff" out subsequent flames.

Referring again to FIG. 2, in addition to providing flame retardancy characteristics, the jacket 10 also substantially retards the flow of gases (e.g. air and moisture), without requiring the use of a separate vapor or air barrier (not shown). To effectively retard the flow of gases, the jacket 10 has a permeability rating in a range of from about 0.02 to about 1.0 as determined by water vapor transmission tests, such as ASTM E96. Typical water vapor transmission tests, such as the ASTM E96, evaluate the transfer of water vapor through semi-permeable and permeable materials over a period of time. In other embodiments, the jacket 10 can have a permeability rating of less than about 0.02 or more than about 1.0.

The jacket 10 of FIG. 2 also provides Class 1 surface burning characteristics of 25 flame spread/50 smoke or lower as provided by surface burn tests, such as ASTM E84. Typical surface burn tests, such as ASTM E84, evaluate the surface flame spread and smoke density in comparison with that of select grade red oak and fiber-cement board surfaces under specific fire exposure conditions.

Figure 5:
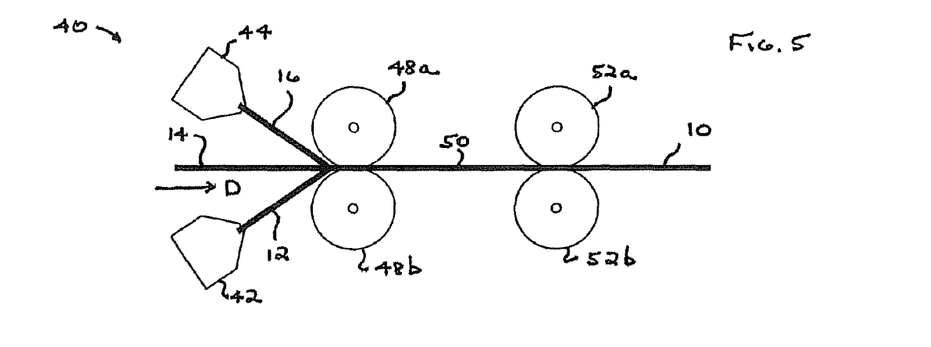
FIG. 5 is a schematic view of an apparatus for manufacturing the insulation jacket of FIG. 2.

Referring now to FIG. 5, a method of manufacturing the jacket 10 is illustrated generally at 40. In a first step, the intermediate layer 14 is provided. In the illustrated embodiment, the intermediate layer 14 is payed out from a roll (not shown). Alternatively, the intermediate layer 14 can be provided by other methods and by other structures. The intermediate layer 14 is directed in a machine direction, indicated by the arrow D. In a next step, the inner layer 12 and the outer layer 16 are provided. In the illustrated embodiment, the inner layer 12 is formed by the first extruder 42 and the outer layer 16 is formed by the second extruder 44. However, in other embodiments, the inner layer 12 and the outer layer 16 can be provided by other methods and by other structures, including the non-limiting example of being payed out from rolls of low-density polyethylene film.

The first and second extruders, 42 and 44, can be any desired structure, mechanism or device sufficient to provide the inner and outer layers, 12 and 16. In a next step, the inner layer 12, intermediate layer 14 and outer layer 16 are joined together and passed through heated compression rollers 48a and 48b. The heated compression rollers 48a and 48b are configured to heat and compress the inner layer 12, intermediate layer 14 and outer layer 16 to a temperature sufficient to attach the inner layer 12, intermediate layer 14 and outer layer 16 together. In the illustrated embodiment, the inner layer 12, intermediate layer 14 and outer layer 16 are heated to a temperature in a range of from about 250° F. to about 400° F. With such high temperatures, the polymeric material begins to melt, which acts to mold the layers together when being compressed under pressure. In other embodiments, the inner layer 12, intermediate layer 14 and outer layer 16 can be heated to a temperature less than about 250° F. or more than about 400° F. Attaching the inner layer 12, intermediate layer 14 and the outer layer 16 together forms a layered jacket 50. As described above, the layered jacket 50 has been formed from the layers of low-density polyethylene and the layer of high-density polyethylene without the use of laminating adhesives. The elimination of the laminating adhesives advantageously provides the layered jacket 50 with the improved flame retardancy, as discussed above.

Referring again to FIG. 5 in a final optional step, the layered jacket 50 is passed through embossing rollers 52a and 52b. The embossing rollers, 52a and 52b, are configured to emboss the pattern of lines 18 on the top surface of the outer layer 16. While the illustrated embodiment shows embossing rollers, 52a and 52b, it should be appreciated that the pattern of lines 18 can be embossed on the top surface of the outer layer 16 with any desired structure, mechanism or device. Embossing the pattern of lines 18 on the top surface of the layered jacket 50 forms jacket 10, as shown in FIG. 2.

Figure 6:
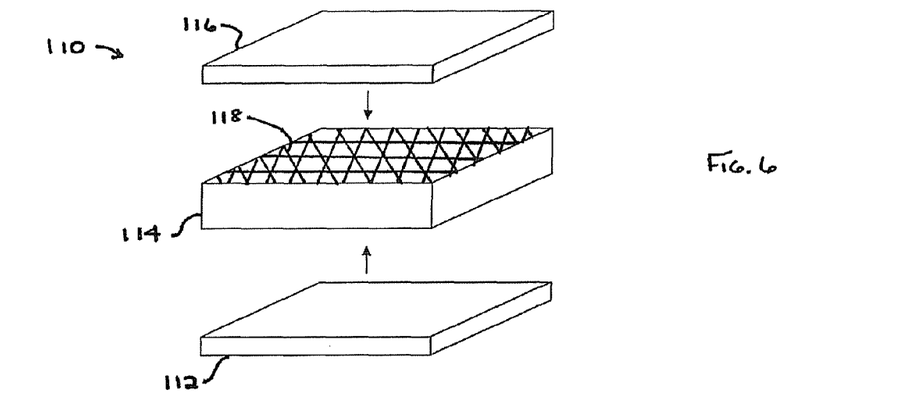
FIG. 6 is a schematic view of an insulation jacket in accordance with another aspect of the present invention.

Referring now to FIG. 6, another embodiment of a jacket is shown generally at 110. The jacket 110 includes an inner layer 112, an intermediate layer 114 and an outer layer 116. In the illustrated embodiment, the inner layer 112, intermediate layer 114 and outer layer 116 are the same as, or similar to, the inner layer 12, intermediate layer 14 and outer layer 16 discussed above and illustrated in FIG. 1. In other embodiments, the inner layer 112, intermediate layer 114 and outer layer 116 can be different from the inner layer 12, intermediate layer 14 and outer layer 16.

Referring again to FIG. 6, the intermediate layer 114 includes a pattern of lines 118. In the illustrated embodiment, the pattern of lines 118 is the same as, or similar to the pattern of lines 18 discussed above and illustrated in FIG. 2. However, the pattern of lines 118 and the pattern of lines 18 can be different from each other.

Figure 7:
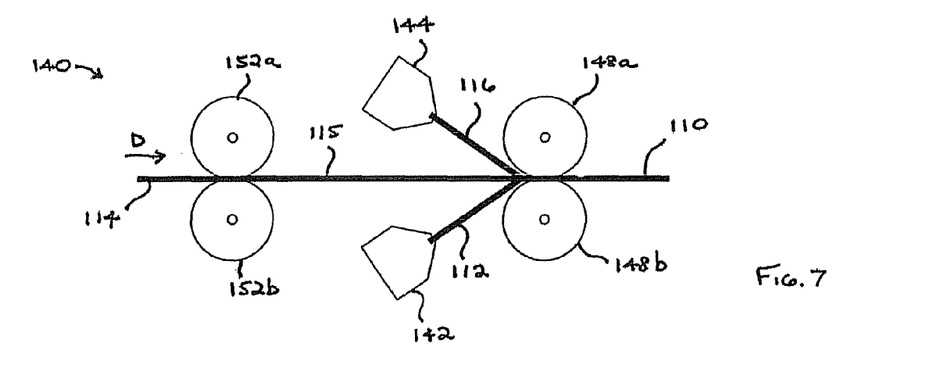
FIG. 7 is a schematic view of an apparatus for manufacturing the insulation jacket of FIG. 6.

Referring now to FIG. 7, the jacket 110 is formed by the process illustrated generally at 140. In a first step, the intermediate layer 114 is provided. In the illustrated embodiment, the intermediate layer 114 is provided in the same manner, or a similar manner, as discussed above and illustrated in FIG. 5. Alternatively, the intermediate layer 114 can be provided in other desired manners. The intermediate layer 114 is directed in a machine direction, indicated by the arrow D.

Referring again to FIG. 7 in a next optional step, the intermediate layer 114 is passed through embossing rollers 152a and 152b. The embossing rollers, 152a and 152b, are configured to emboss the pattern of lines 118 on the top surface of the intermediate layer 114. In the illustrated embodiment, the embossing rollers, 152a and 152b, are the same as, or similar to, the embossing rollers, 52a and 52b, discussed above and illustrated in FIG. 5. In other embodiments, the embossing rollers, 152a and 152b, can be different than the embossing rollers, 52a and 52b. Embossing the pattern of lines 118 on the top surface of the intermediate layer 114 forms embossed intermediate layer 115.

In a next step, the inner layer 112 and the outer layer 116 are formed and provided by the first extruder 142 and the second extruder 144. In the illustrated embodiment, the first extruder 142 and the second extruder 144 are the same as, or similar to, the first extruder 42 and the second extruder 44 discussed above and illustrated in FIG. 5. However, in other embodiments, the first extruder 142 and the second extruder 144 can be other structures sufficient to form and provide the inner layer 112 and the outer layer 166. In a next step, the inner layer 112, embossed intermediate layer 115 and outer layer 116 are joined together and passed through heated compression rollers 148a and 148b. The heated compression rollers 148a and 148b are configured to heat and compress the inner layer 112, embossed intermediate layer 115 and outer layer 116 to a temperature sufficient to attach the inner layer 112, embossed intermediate layer 115 and outer layer 16 together. In the illustrated embodiment, the heated compression rollers 148a and 148b are the same as, or similar to, the heated compression rollers 48a and 48b discussed above an shown in FIG. 5. In other embodiments, the heated compression rollers 148a and 148b can be different from the heated compression rollers 48a and 48b. Attaching the inner layer 112, embossed intermediate layer 115 and the outer layer 116 together forms the jacket 110. As discussed above, the pattern of lines 118 is embossed on the top surface of the intermediate layer 114 thereby fowling the embossed intermediate layer 115. Following attachment of the outer layer 116 to the embossed intermediate layer 115, the outer layer 116 fauns the contours of the pattern of lines 118, thereby allowing the pattern of lines 118 to be visible on the top surface of the outer layer 116.

Figure 8:
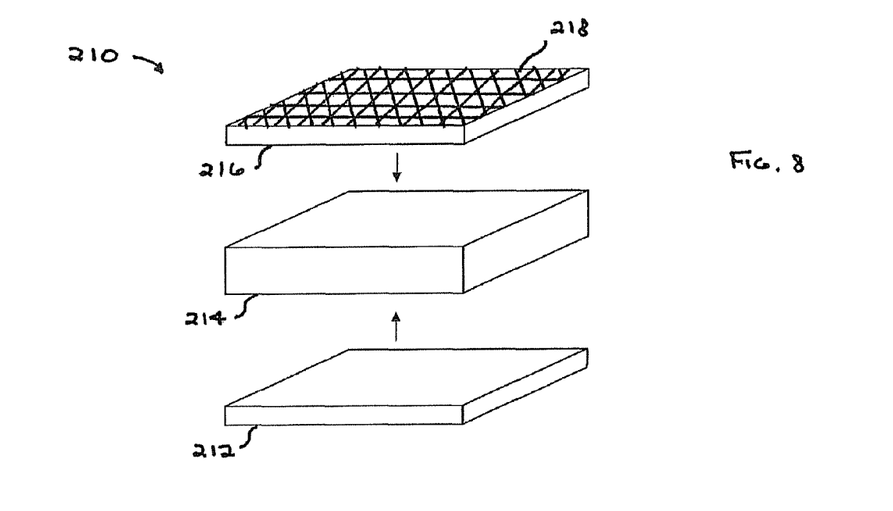
FIG. 8 is a schematic view of an insulation jacket in accordance with yet another aspect of the present invention.

Referring now to FIG. 8, another embodiment of a jacket is shown generally at 210. The jacket 210 includes an inner layer 212, an intermediate layer 214 and an outer layer 216. In the illustrated embodiment, the inner layer 212, intermediate layer 214 and outer layer 216 are the same as, or similar to, the inner layer 12, intermediate layer 14 and outer layer 16 discussed above and illustrated in FIG. 1. In other embodiments, the inner layer 212, intermediate layer 214 and outer layer 216 can be different from the inner layer 12, intermediate layer 14 and outer layer 16.

Referring again to FIG. 8, the outer layer 216 includes a pattern of lines 218. In the illustrated embodiment, the pattern of lines 218 is the same as, or similar to, the pattern of lines 18 discussed above and illustrated in FIG. 2. However, the pattern of lines 218 and the pattern of lines 18 can be different from each other.

Figure 9:
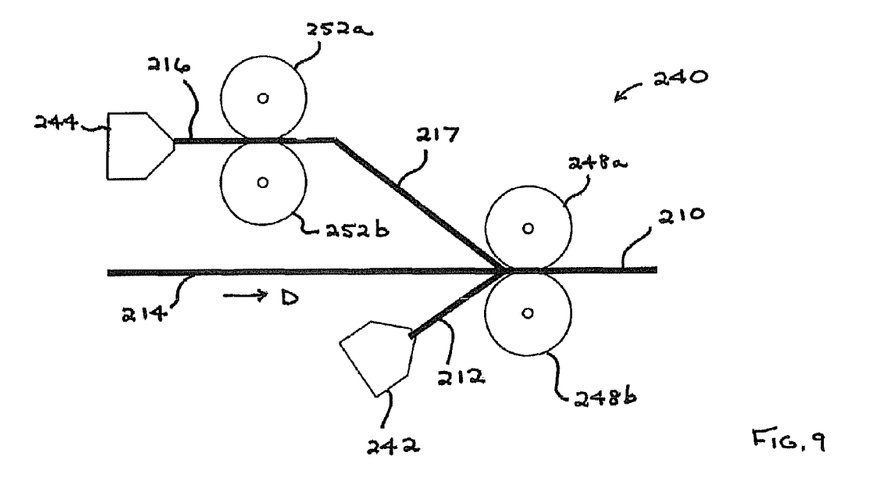
FIG. 9 is a schematic view of an apparatus for manufacturing the insulation jacket of FIG. 8.

Referring now to FIG. 9, the jacket 210 is formed by the process illustrated generally at 240. In a first step, the intermediate layer 214 is provided. In the illustrated embodiment, the intermediate layer 214 is provided in the same manner, or a similar manner, as discussed above and illustrated in FIG. 5. Alternatively, the intermediate layer 214 can be provided in other desired manners. The intermediate layer 214 is directed in a machine direction, indicated by the arrow D.

Referring again to FIG. 9 in a next step, the inner layer 212 and the outer layer 216 are formed and provided by the first extruder 242 and the second extruder 244. In the illustrated embodiment, the first extruder 242 and the second extruder 244 are the same as, or similar to, the first extruder 42 and the second extruder 44 discussed above and illustrated in FIG. 5. However, in other embodiments, the first extruder 242 and the second extruder 244 can be other structures sufficient to form and provide the inner layer 212 and the outer layer 216.

Referring again to FIG. 9, the outer layer 216 is passed through embossing rollers 252a and 252b. The embossing rollers, 252a and 252b, are configured to emboss the pattern of lines 218 on the top surface of the outer layer 216. In the illustrated embodiment, the embossing rollers, 252a and 252b, are the same as, or similar to, the embossing rollers, 52a and 52b, discussed above and illustrated in FIG. 5. In other embodiments, the embossing rollers, 252a and 252b, can be different than the embossing rollers, 52a and 52b. Embossing the pattern of lines 218 on the top surface of the outer layer 216 forms embossed outer layer 217.

In a next step, the inner layer 212, intermediate layer 214 and embossed outer layer 217 are joined together and passed through heated compression rollers 248a and 248b. The heated compression rollers 248a and 248b are configured to heat and compress the inner layer 212, intermediate layer 214 and embossed outer layer 217 to a temperature sufficient to melt the polymeric material and attach the inner layer 212, intermediate layer 214 and embossed outer layer 217 together. In the illustrated embodiment, the heated compression rollers 248a and 248b are the same as, or similar to, the heated compression rollers 48a and 48b discussed above an shown in FIG. 5. In other embodiments, the heated compression rollers 248a and 248b can be different from the heated compression rollers 48a and 48b. Attaching the inner layer 212, intermediate layer 214 and the embossed outer layer 217 together forms the jacket 210.

Figure 10:
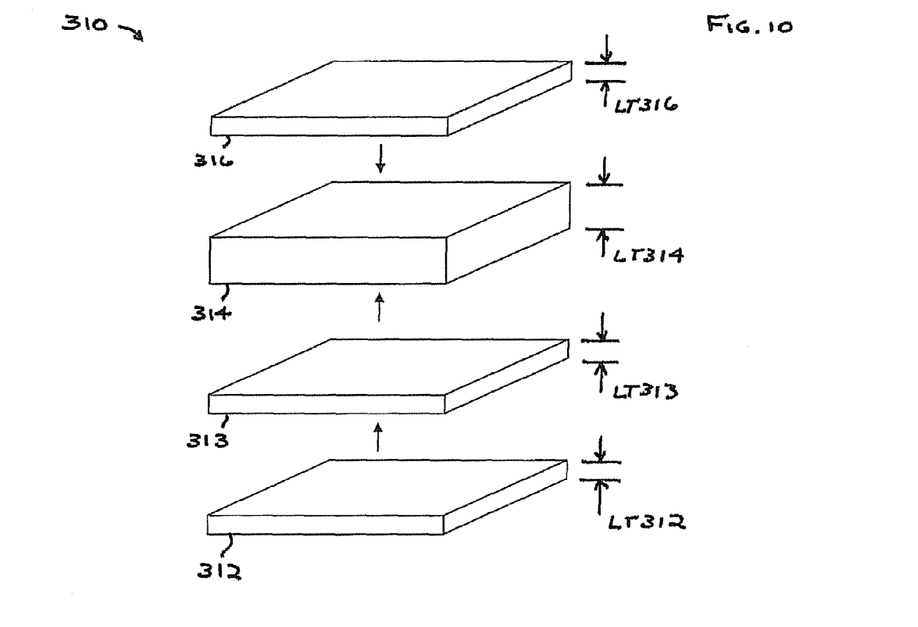
FIG. 10 is a schematic view of an insulation jacket in accordance with yet another aspect of the present invention.

Referring now to the FIG. 10, another embodiment of a jacket is shown generally at 310 in an exploded view. The jacket 310 includes an inner layer 312, a first intermediate layer 313, a second intermediate layer 314 and an outer layer 316. The jacket may further include a third intermediate layer, although not included in the illustrative embodiment.

Referring again to FIG. 10, the inner layer 312 is configured as a vapor barrier layer. In the illustrated embodiment, the inner layer 312 is formed from a metalized polymeric material, such as the non-limiting example of metalized polyethylene terephthalate (mPET). Alternatively, the inner layer 312 can be made from other materials, such as the non-limiting examples of metalized polypropylene.

The inner layer 312 has a layer thickness LT312. In the illustrated embodiment, the layer thickness LT312 is in a range of from about 0.05 mil to about 0.8 mil. However, in other embodiments, layer thickness LT312 can be less than about 0.05 mil or more than about 0.8 mil, including about 1.0 mil.

Referring again to FIG. 10, the first intermediate layer 313 is configured to provide the jacket 310 with tensile strength, puncture resistance and resistance to many chemicals and fluids. In the illustrated embodiment, the first intermediate layer 313 is a scrim formed from a polymeric material, such as for example, polyethylene terephthalate (PET). In other embodiments, the first intermediate layer 313 can be formed from other polymeric materials, including the non-limiting examples of polyvinyl chloride (PVC) and polyvinylidene chloride (PVDC).

The first intermediate layer 313 has a layer thickness LT313. In the illustrated embodiment, the layer thickness LT313 is in a range of from about 0.5 mil to about 6.0 mil, such as 2.0 mil. However, in other embodiments, the layer thickness LT313 can be less than about 0.5 mil or more than about 6.0 mil.

Optionally, a pattern of lines 318 can be formed on a surface, preferably the top surface, of the first intermediate layer 313 of the jacket 310. In the illustrated embodiment, the pattern of lines 318 is the same as, or similar to, the pattern of lines 18 discussed above and shown in FIG. 2. However, in other embodiments, the pattern of lines 318 can be different from the pattern of lines 18. The pattern of lines 318 can be formed in any desired manner, including the non-limiting example of embossing.

Referring again to FIG. 10, the second intermediate layer 314, and/or optional third intermediate layer (not shown), is configured to provide the jacket 310 with additional puncture resistance and further configured to facilitate bonding of the layers, 312, 313, 314 and 316. In the illustrated embodiment, the second intermediate layer 314 is formed from a polymeric-based material, such as for example, polyvinyl chloride (PVC). In other embodiments, the second intermediate layer 314, and/or optional third intermediate layer (not shown), can be formed from other polymeric, including the non-limiting examples of polyvinylidene chloride (PVDC), fire resistant polyethylene terephthalate (FR PET) and white fire resistant polyethylene terephthalate (WFR PET), or fire resistant coated polyethylene terephthalate. In some embodiments, the second 314 and/or third intermediate layer can be formed from materials including a halogen-based fire-retardant material. In still other embodiments, the second 314 and/or third intermediate layer can include a halogen-based fire retardant coating.

The second intermediate layer 314 has a layer thickness LT314. In the illustrated embodiment, the layer thickness LT314 is in a range of from about 1.5 mil to about 2.50 mil. If present, the third intermediate layer (not shown) may also have a layer thickness in a range of from about 1.5 mil to about 2.50 mil. However, in other embodiments, the layer thicknesses can be less than about 1.5 mil or more than about 2.5 mil.

Referring again to FIG. 10, the outer layer 316 is configured to provide the jacket 310 with flexibility, durability and resistance to many chemicals and fluids. In the illustrated embodiment, the outer layer 316 is formed from a polymeric material, such as for example, polypropylene and/or polyvinyl chloride. In other embodiments, the outer layer 316 can be formed from other polymeric materials, including the non-limiting example of polyethylene.

The outer layer 316 has a layer thickness LT316. In the illustrated embodiment, the layer thickness LT316 is in a range of from about 0.5 mil to about 2.0 mil. However, in other embodiments, layer thickness LT316 can be less than about 0.5 mil or more than about 2.0 mil.

Figure 11:
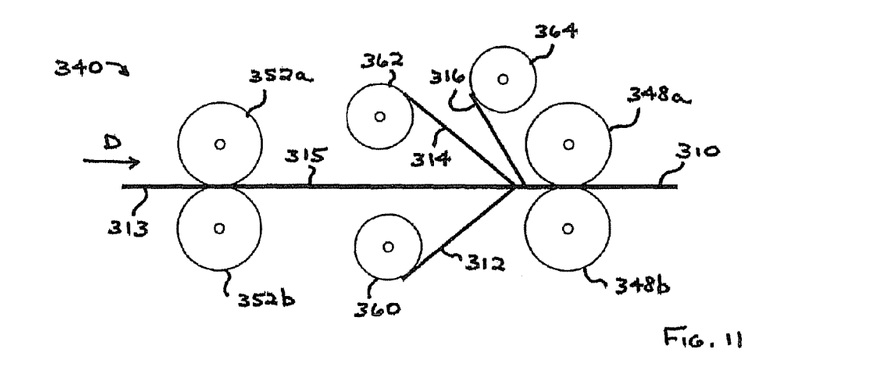
FIG. 11 is a schematic view of an apparatus for manufacturing the jacket of FIG. 10.

Referring now to FIG. 11, the jacket 310 is formed by the process illustrated generally at 340. In a first step, the first intermediate layer 313 is provided. In the illustrated embodiment, the first intermediate layer 313 is provided in the same manner as intermediate layer 114, or in a similar manner, as discussed above and illustrated in FIG. 7. Alternatively, the intermediate layer 313 can be provided in other desired manners. The intermediate layer 313 is directed in a machine direction, indicated by the arrow D.

Referring again to FIG. 11 in a next optional step, the first intermediate layer 313 is passed through embossing rollers 352a and 352b. The embossing rollers, 352a and 352b, are configured to emboss the pattern of lines 318 on the top surface of the first intermediate layer 313. In the illustrated embodiment, the embossing rollers, 352a and 352b, are the same as, or similar to, the embossing rollers, 52a and 52b, discussed above and illustrated in FIG. 5. In other embodiments, the embossing rollers, 352a and 352b, can be different than the embossing rollers, 52a and 52b. Embossing the pattern of lines 318 on the top surface of the first intermediate layer 313 forms embossed first intermediate layer 315.

In a next step, the inner layer 312 is payed out from roll 360. Similarly, the second intermediate layer 314, and optional third intermediate layer, is payed out from roll 362 and the outer layer 316 is payed out from roll 364. While the illustrated embodiment shows the layers 312, 314 and 316 as being provided from rolls, 360, 362 and 364, it should be appreciated that in other embodiments the layers 312, 314 and 316 can be provided by other structures, mechanisms or devices including the non-limiting example of extruders.

In a next step, the embossed first intermediate layer 315, inner layer 312, second intermediate layer 314, optional third intermediate layer, and outer layer 316 are joined together and passed through heated compression rollers 348a and 348b. The heated compression rollers 348a and 348b are configured to heat and compress the embossed first intermediate layer 315, inner layer 312, second intermediate layer 314, optional third intermediate layer, and outer layer 316 to a temperature sufficient to attach the embossed first intermediate layer 315, inner layer 312, second intermediate layer 314, optional third intermediate layer, and outer layer 316 together. The temperature should be sufficient to cause the polymeric materials to melt at least partially, causing the layers to attach together under pressure. In the illustrated embodiment, the heated compression rollers 348a and 348b are the same as, or similar to, the heated compression rollers 48a and 48b discussed above and shown in FIG. 5. In other embodiments, the heated compression rollers 348a and 348b can be different from the heated compression rollers 48a and 48b. Attaching the embossed first intermediate layer 315, inner layer 312, second intermediate layer 314, optional third intermediate layer, and outer layer 316 together forms the jacket 310. As discussed above, the pattern of lines 318 is embossed on the top surface of the first intermediate layer 313 thereby forming the embossed first intermediate layer 315. Following attachment of the second intermediate layer 314, optional third intermediate layer, and the outer layer 316 to the embossed first intermediate layer 315, the outer layer 316 forms the contours of the pattern of lines 318, thereby allowing the pattern of lines 318 to be visible on the top surface of the outer layer 316.

In a manner similar to that discussed above for jacket 10, the jacket 310 differs from conventional jackets in that the jacket 310 is formed of different layer materials and is further formed without the use of adhesives. The layered materials and the elimination of adhesives advantageously provide the jacket 310 with superior characteristics, including improved flame retardancy.

The TAPPI T461 test was also performed for jacket 310. Similar to the test described above, the test was conducted using an ignition source positioned directly under the bottom edge of a specimen. During the test, the ignition source produced a flame that was 40 mm (1.6 in.) high for 12.0 seconds, and then the ignition source was removed. The flaming time, glowing time and char length were recorded after the specimen had ceased flaming. As described above, if a specimen burns along its 8.25 inch length during the test, then the specimen is regarded as a failure under the ASTM C1136 specification.

Figure 12:
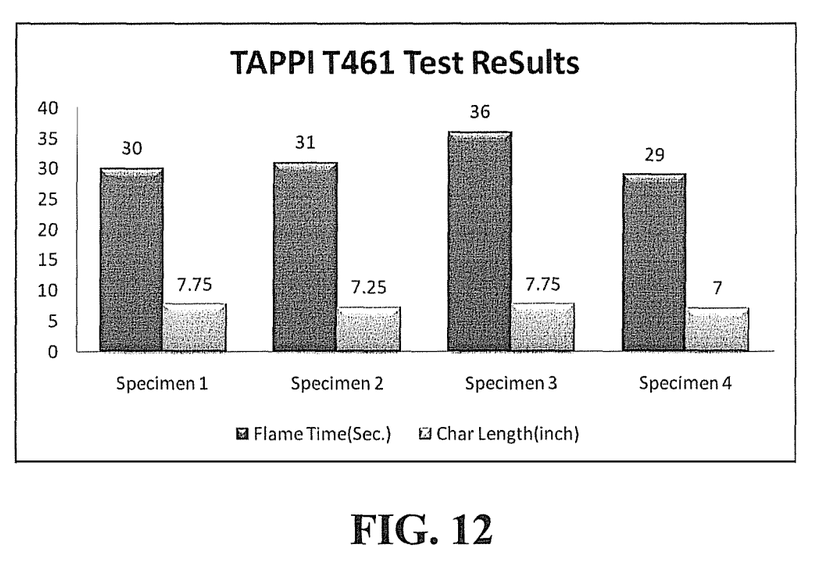
FIG. 12 is a chart illustrating the results of flame retardancy testing for a multilayered insulation jacket in accordance with the present invention.

The results of the TAPPI T461 testing for the jacket 310 are shown in the chart of FIG. 12. Four specimens of jacket 310 identified in FIG. 12 were tested. The four specimen are listed below in Table 1.

TABLE 1

| SPECIMEN | igniting flame time |
|---|---|
| 1. PP ( ), + Fire Retardant (FR) PET ( ), + PET ( ) + PET scrim ( ) + metalized PET(mPET) ( ) | 12 |
| 2. PET + FR + PET + PETscritn + mPET | 12 |
| 3. PET + saran + PET + PET scrim + mPET | 12 |
| 4. PET + WFR + PET + PET scrim + mPET | 12 |

The first specimen included a metalized PET (mPET) film forming an inner layer, with PET scrim, PET, and fire retardant (FR) film intermediate layers, and a polypropylene outer layer. The FR films are a polyester film that contain a halogen free flame retardant. The second specimen was the same as the first, with a PET outer layer rather than a polypropylene outer layer. The third specimen includes a saran intermediate layer, which is a Dow Vapor Retarder Film, rather than a FR layer, with a PET outer layer. The fourth specimen includes a WFR layer, which is a white translucent polyester film, as opposed to the transparent FR film. However, as with FR film, WFR also contain halogen free flame retardant. Each specimen was tested with a flame duration of 12.0 seconds.

As shown in FIG. 12, a flame duration of 12.0 seconds resulted in a char length of 7.75 inches for the first specimen, a char length of 7.25 inches for the second specimen, a char length of 7.75 inches for the third specimen, a char length of 7 inches for the fourth specimen, and a char length of 6.75 inches for the fifth specimen. Accordingly, each specimen demonstrated a char length of less than 8.25 inches. Accordingly, the jacket 310 passed the flame retardancy standards provided by ASTM C1136.

The principle and mode of operation of the flame retardant polymer jackets have been described in certain embodiments. However, it should be noted that the flame retardant polymer jackets may be practiced otherwise than as specifically illustrated and described without departing from its scope.

What is claimed is:

1. A jacket configured to encase building component insulation, the jacket comprising:
 an inner layer;
 an intermediate layer attached to the inner layer; and
 an outer layer attached to the intermediate layer, wherein the inner layer, intermediate layer and outer layers are configured for attachment to each other only with the use of at least one of heat, polymeric material, and pressure;
 wherein at least one layer includes a pattern of lines; and
 wherein the jacket complies with the standards of flame retardancy as provided by ASTM C1136.

2. The jacket of claim 1, wherein the at least one of the inner layer, intermediate layer and outer layer is formed from a polymeric material.

3. The jacket of claim 2, wherein said polymeric material is selected from a group consisting of high-density polyethylene, low-density polyethylene, polypropylene, polyvinylidene chloride, and metalized polymeric materials.

4. The jacket of claim 1, wherein said inner layer and outer layer each have a thickness from about 1.0 mil to about 3.0 mil.

5. The jacket of claim 4, wherein the thickness of said inner layer and outer layer is essentially the same.

6. The jacket of claim 4, wherein said inner layer has a different thickness than said outer layer.

7. The jacket of claim 1, wherein said intermediate layer has a thickness from about 4.0 mil to about 6.0 mil.

8. The jacket of claim 1, wherein said jacket has a thickness from about 5.0 mil to about 9.0 mil.

9. The jacket of claim 1, wherein said pattern of lines comprises a pattern of embossed lines.

10. The jacket of claim 1, wherein said pattern of lines comprises a tri-directional pattern.

11. The jacket of claim 1, wherein said layers are configured for attachment without an adhesive.

12. A jacket configured to encase building component insulation, the jacket comprising:
 an inner layer;
 a first intermediate layer attached to the inner layer;
 a second intermediate layer attached to the first intermediate layer; and
 an outer layer attached to the second intermediate layer, wherein the inner layer, first intermediate layer, second intermediate layer and outer layer are each configured for attachment only with the use of at least one of heat and a polymeric material;
 wherein said first intermediate layer includes a pattern of lines; and
 wherein the jacket complies with the standards of flame retardancy as provided by ASTM C1136.

13. The jacket of claim 12, further including a third intermediate layer attached to the second intermediate layer, and the outer layer is attached to said third intermediate layer.

14. The jacket of claim 13, wherein at least one of the inner layer, first intermediate layer, second intermediate layer, third intermediate layer and outer layer comprises a polymeric material.

15. The jacket of claim 13, wherein at least one of said second and third intermediate layers is formed from a material selected from polyvinyl chloride, polyvinylidene chloride, fire retardant polyethylene terephthalate, polyethylene terephthatlate, and fire retardant coated polyethylene terephthalate.

16. The jacket of claim 13, wherein at least one of said second and third intermediate layers has a thickness from about 1.5 mil to about 2.50 mil.

17. The jacket of claim 12, wherein said inner layer is a vapor barrier layer.

18. The jacket of claim 12, wherein said inner layer comprises a thickness of about 0.05 mil to about 1.0 mil.

19. The jacket of claim 12, wherein said first intermediate layer is formed from a material selected from polyethylene terephthalate, polyvinyl chloride, and polyvinylidene chloride.

20. The jacket of claim 12, wherein said first intermediate layer has a thickness of from about 0.5 mil to about 2.0 mil.

21. The jacket of claim 12, wherein said outer layer is formed from polymeric materials selected from polypropylene, polyethylene terephthalate, and polyvinyl chloride.

22. The jacket of claim 12, wherein said outer layer has a thickness of from about 0.5 mil to about 2.0 mil.

23. The jacket of claim 1, wherein said pattern of lines comprises a bi-directional pattern.

24. The jacket of claim 12, wherein said pattern of lines comprises a pattern of embossed lines.

25. The jacket of claim 12, wherein said pattern of lines comprises a bi-directional pattern.

26. The jacket of claim 12, wherein said pattern of lines comprises a tri-directional pattern.

* * * * *